(12) United States Patent
Park

(10) Patent No.: US 9,899,851 B2
(45) Date of Patent: Feb. 20, 2018

(54) SYSTEM FOR CHARGING BATTERY OF ENERGY STORAGE SYSTEM USING PCS

(71) Applicant: LSIS CO., LTD., Anyang-si, Gyeonggi-do (KR)

(72) Inventor: Tae Bum Park, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 14/630,443

(22) Filed: Feb. 24, 2015

(65) Prior Publication Data

US 2015/0270732 A1    Sep. 24, 2015

(30) Foreign Application Priority Data

Mar. 20, 2014  (KR) ........................ 10-2014-0033024

(51) Int. Cl.
　　*H02J 7/00*　　(2006.01)
　　*H01M 10/44*　　(2006.01)
　　*H01M 10/46*　　(2006.01)
　　*H02J 3/38*　　(2006.01)
　　*H02J 7/04*　　(2006.01)
　　*H02J 7/35*　　(2006.01)

(52) U.S. Cl.
　　CPC ............ *H02J 7/0052* (2013.01); *H02J 3/383* (2013.01); *H02J 7/042* (2013.01); *H02J 7/35* (2013.01); *Y02E 10/563* (2013.01); *Y02E 10/566* (2013.01)

(58) Field of Classification Search
　　USPC ........................................................ 320/101
　　See application file for complete search history.

(56) References Cited

U.S. PATENT DOCUMENTS

| | | | | |
|---|---|---|---|---|
| 6,979,989 | B2 * | 12/2005 | Schripsema | ............... G05F 1/67 320/101 |
| 9,343,906 | B2 * | 5/2016 | Kaiser | ..................... H02J 3/383 |
| 2007/0194759 | A1 * | 8/2007 | Shimizu | ................ H02J 7/0016 320/166 |

(Continued)

FOREIGN PATENT DOCUMENTS

| | | |
|---|---|---|
| CN | 102170241 | 8/2011 |
| CN | 203456934 | 2/2014 |

(Continued)

OTHER PUBLICATIONS

European Patent Office Application Serial No. 15157344.1, Search Report dated Jul. 31, 2015, 9 pages.

(Continued)

*Primary Examiner* — Samuel Berhanu
(74) *Attorney, Agent, or Firm* — K&L Gates LLP

(57) ABSTRACT

A system for charging a battery of an energy storage system using a photovoltaic inverter, includes: a photovoltaic inverter configured to convert a DC power generated from a photovoltaic module into an AC power, and to output the AC power; and an energy storage system configured to set a preset power value by considering an output power of the photovoltaic inverter according to the amount of solar radiation, and configured to charge a battery in a mode selected from a constant current (CC) mode and a constant voltage (CV) mode based on a comparison result obtained by comparing the preset power value, with an input power generated from the photovoltaic module and input from the photovoltaic inverter.

4 Claims, 4 Drawing Sheets

(56) References Cited

U.S. PATENT DOCUMENTS

| | | | | |
|---|---|---|---|---|
| 2009/0266397 | A1* | 10/2009 | Gibson | H02S 40/38 136/244 |
| 2010/0001681 | A1* | 1/2010 | Zhang | H01L 31/048 320/101 |
| 2011/0210608 | A1* | 9/2011 | O'Brien | H02J 3/383 307/31 |
| 2011/0273020 | A1* | 11/2011 | Balachandreswaran | H01L 31/02021 307/71 |

FOREIGN PATENT DOCUMENTS

| | | |
|---|---|---|
| EP | 2362519 | 8/2011 |
| JP | 3178526 | 8/2012 |
| WO | 2011/136143 | 3/2011 |
| WO | 2012132948 | 10/2012 |
| WO | 2013128947 | 9/2013 |

OTHER PUBLICATIONS

Japan Patent Office Application Serial No. 2015-050416, Office Action dated Mar. 8, 2016, 2 pages.
European Patent Office Application Serial No. 15157344.1, Office Action dated Nov. 22, 2016, 10 pages.
The State Intellectual Property Office of the People's Republic of China Application Serial No. 201510119515.8, Office Action dated Nov. 3, 2016, 6 pages.
Japan Patent Office Application No. 2015-050416, Office Action dated Feb. 9, 2017, 6 pages.

* cited by examiner though # US 9,899,851 B2

SYSTEM FOR CHARGING BATTERY OF ENERGY STORAGE SYSTEM USING PCS

CROSS-REFERENCE TO RELATED APPLICATION

Pursuant to 35 U.S.C. § 119(a), this application claims the benefit of earlier filing date and right of priority to Korean Application No. 10-2014-0033024, filed on Mar. 20, 2014, the contents of which is incorporated by reference herein in its entirety.

BACKGROUND OF THE INVENTION

1. Field of the Invention

This specification relates to a system for charging a battery of an energy storage system using a photovoltaic inverter (power conditioning system: PCS), and more particularly, to a system for charging a battery of an energy storage system using a photovoltaic inverter, capable of charging energy generated from a single-phase photovoltaic inverter, to a battery of a single-phase energy storage system.

2. Background of the Invention

A single-phase photovoltaic inverter (power conditioning system: PCS) indicates equipment for generating electricity by converting DC energy supplied from a photovoltaic module, into AC energy. And a single-phase energy storage system (ESS) indicates equipment for converting DC energy charged to a battery into AC energy, and then supplying the AC energy to a load.

The single-phase photovoltaic inverter and the single-phase ESS have something in common, in that they convert DC energy into AC energy, and they are configured as a single-phase. However, the single-phase photovoltaic inverter and the single-phase ESS may be differentiated from each other, according to whether DC energy is supplied from a photovoltaic module or a battery.

The single-phase ESS using a battery should charge the battery when the battery is discharged. In the conventional art, the battery was charged with power supplied from a system. However, the battery of the single-phase ESS may be charged with energy generated from a single-phase photovoltaic inverter.

In this case, if the single-phase photovoltaic inverter supplies a smaller amount of energy than a required amount of energy by the single-phase ESS, the single-phase ESS may not smoothly perform a charging operation. Further, the single-phase photovoltaic inverter may be stopped or damaged due to an over-load.

Therefore, the single-phase ESS should be always informed of the amount of energy generated from the single-phase photovoltaic inverter.

However, an output power (the amount of generated energy) of the single-phase photovoltaic inverter is supplied from a photovoltaic module, and the photovoltaic module generates energy according to the amount of solar radiation. Thus, if the amount of solar radiation is changed, an output power of the single-phase photovoltaic inverter is also changed. This may cause energy charged to the single-phase ESS, to be changed according to the amount of solar radiation.

Therefore, it is required for the single-phase ESS to check change of an output power of the single-phase photovoltaic inverter according to the amount of solar radiation.

FIG. 1 is a block diagram illustrating a system for charging a battery of an energy storage system using a PCS in accordance with the conventional art.

Referring to FIG. 1, the conventional system 10 for charging a battery of an energy storage system using a PCS may include a photovoltaic module 11, a single-phase photovoltaic inverter 12, a single-phase energy storage system (ESS) 13, and a load unit 14.

The single-phase ESS 13 may receive information on the amount of an output power of the single-phase photovoltaic inverter 12 according to the amount of solar radiation, using a communication line 15, in order to check that an output power of the single-phase photovoltaic inverter 12 by photovoltaic energy generated from the photovoltaic module 11 is changed according to the amount of solar radiation.

However, the conventional system 10 using such a communication line may have the following disadvantages. Firstly, the single-phase photovoltaic inverter 12 and the single-phase ESS 13 should have the same software related to communication, since communication protocols thereof should be identical to each other. Further, the single-phase photovoltaic inverter 12 and the single-phase ESS 13 should have the same hardware related to communication, by having communication cables and RX/TX lines of ports identical to each other. In a case where a single-phase photovoltaic inverter manufactured from 'A' company and a single-phase ESS manufactured from 'B' company are used, if software and hardware of the single-phase photovoltaic inverter are different from software and hardware of the single-phase ESS, the system 10 shown in FIG. 1 cannot be implemented.

FIG. 2 is a block diagram illustrating a system for charging a battery of an energy storage system (ESS) using a PCS in accordance with the conventional art.

Referring to FIG. 2, the conventional system 20 for charging a battery of an energy storage system (ESS) using a PCS may include a photovoltaic module 21, a single-phase photovoltaic inverter 22, a single-phase energy storage system (ESS) 23, a load unit 24, and an EMS 25.

The single-phase ESS 23 may receive information on the amount of an output power of the single-phase photovoltaic inverter 22 according to the amount of solar radiation, using a communication line 15, from the EMS 25 or a controller, in order to check that an output power of the single-phase photovoltaic inverter 22 by photovoltaic energy generated from the photovoltaic module 21 is changed according to the amount of solar radiation.

The conventional system 20 has an advantage that a battery of the single-phase ESS 23 can be smoothly charged with respect to change of an output power of the single-phase photovoltaic inverter 22 according to the amount of solar radiation, by operating the single-phase photovoltaic inverter 22 and the single-phase ESS 23 using the EMS 25 (controller). However, the conventional system 20 has a disadvantage that the EMS 25 (controller), the single-phase photovoltaic inverter 22, and the single-phase ESS 23 have the same software and hardware related to communication, for communication control.

In a case where a single-phase photovoltaic inverter manufactured from 'A' company and a single-phase ESS manufactured from 'B' company are used, if software and hardware of the single-phase photovoltaic inverter are different from software and hardware of the single-phase ESS, the system 20 shown in FIG. 2 cannot be implemented.

SUMMARY OF THE INVENTION

Therefore, an aspect of the detailed description is to provide a system for charging a battery of an energy storage system using a photovoltaic inverter, capable of charging energy generated from a single-phase photovoltaic inverter, to a battery of a single-phase energy storage system.

To achieve these and other advantages and in accordance with the purpose of this specification, as embodied and broadly described herein, there is provided a system for charging a battery of an energy storage system using a photovoltaic inverter, the system including: a photovoltaic inverter configured to convert a DC power generated from a photovoltaic module into an AC power, and to output the AC power; and an energy storage system configured to set a preset power value by considering an output power of the photovoltaic inverter according to the amount of solar radiation, and configured to charge a battery in a mode selected from a constant current (CC) mode and a constant voltage (CV) mode based on a comparison result obtained by comparing the preset power value, with an input power generated from the photovoltaic module and input from the photovoltaic inverter, wherein the energy storage system includes: a current measuring unit configured to measure an input current; a voltage measuring unit configured to measure an input voltage; a controller configured to calculate an input power based on the input current and the input voltage measured by the current measuring unit and the voltage measuring unit, respectively, configured to compare the input power with the preset power value, and configured to output a charging control signal according to the CC mode when the input power is equal to or more than the preset power value, and configured to output a charging control signal according to the CV mode when the input power is less than the preset power value; and a charging unit configured to charge the battery, by supplying power input from the photovoltaic inverter to the battery in the CC mode or in the CV mode, by the charging control signal generated from the controller.

The controller may be configured to charge the battery in a CV mode when the input power is increased as time lapses, and to charge the battery in a CC mode when the input power is equal to or more than the preset power value.

The controller may be configured to charge the battery in a CC mode when the input power is decreased as time lapses, and to charge the battery in a CV mode when the input power is less than the preset power value.

The controller may be configured to charge the battery in a CV mode when the input power is increased and decreased as time lapses, to charge the battery in a CC mode when the input power is equal to or more than the preset power value, and to charge the battery in a CV mode when the input power is less than the preset power value.

In the present invention, a battery of the energy storage system (ESS) can be stably charged by using a single-phase photovoltaic inverter, even if an output power of the single-phase photovoltaic inverter is changed according to the amount of solar radiation.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. However, the present invention is not limited to the embodiments. As such, the present disclosure should be construed to extend to any alterations, equivalents and substitutes in addition to those which are particularly set out in the accompanying drawings.

As terms used in the present invention, general terms which are generally used have been selected. However, in a specific case, terms selected by the applicant have been used. In this case, the meaning of the terms have been disclosed in detail in descriptions of the specification. Thus, it should be noted that the present invention should be understood with the meaning of the terms, not with the mere name of the terms.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
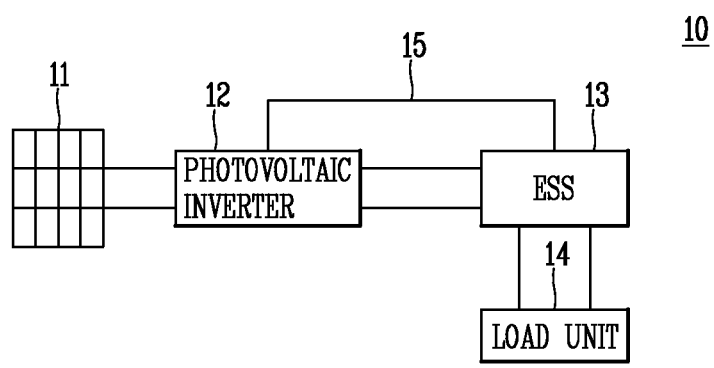
FIG. 1 is a block diagram illustrating a system for charging a battery of an energy storage system using a PCS in accordance with the conventional art.
Figure 2:
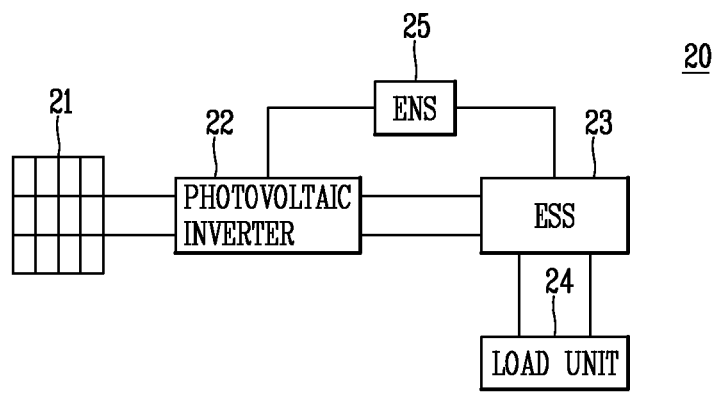
FIG. 2 is a block diagram illustrating a system for charging a battery of an energy storage system (ESS) using a PCS in accordance with the conventional art.
Figure 3:
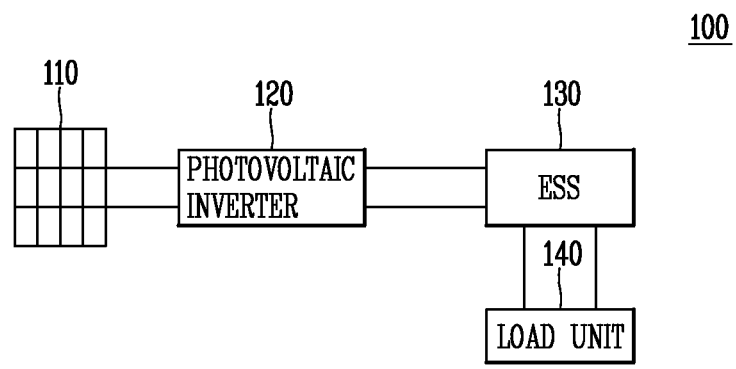
FIG. 3 is a block diagram illustrating a system for charging a battery of an energy storage system (ESS) using a PCS according to one embodiment of the present invention.

FIG. 3 is a block diagram illustrating a system for charging a battery of an energy storage system (ESS) using a photovoltaic inverter (power conditioning system: PCS) according to one embodiment of the present invention.

Referring to FIG. 3, the system 100 for charging a battery of an energy storage system (ESS) using a PCS according to one embodiment of the present invention may include a photovoltaic module 110, a photovoltaic inverter (single-phase photovoltaic inverter) 120, an energy storage system (ESS) (single-phase ESS) 130, and a load unit 140.

The ESS 130 may receive information on the amount of output power of the photovoltaic inverter 120 according to the amount of solar radiation, from the photovoltaic inverter 120, in order to check that the amount of power output from the photovoltaic inverter 120, by photovoltaic energy generated from the photovoltaic module 110 is variable according to the amount of solar radiation.

Figure 4:
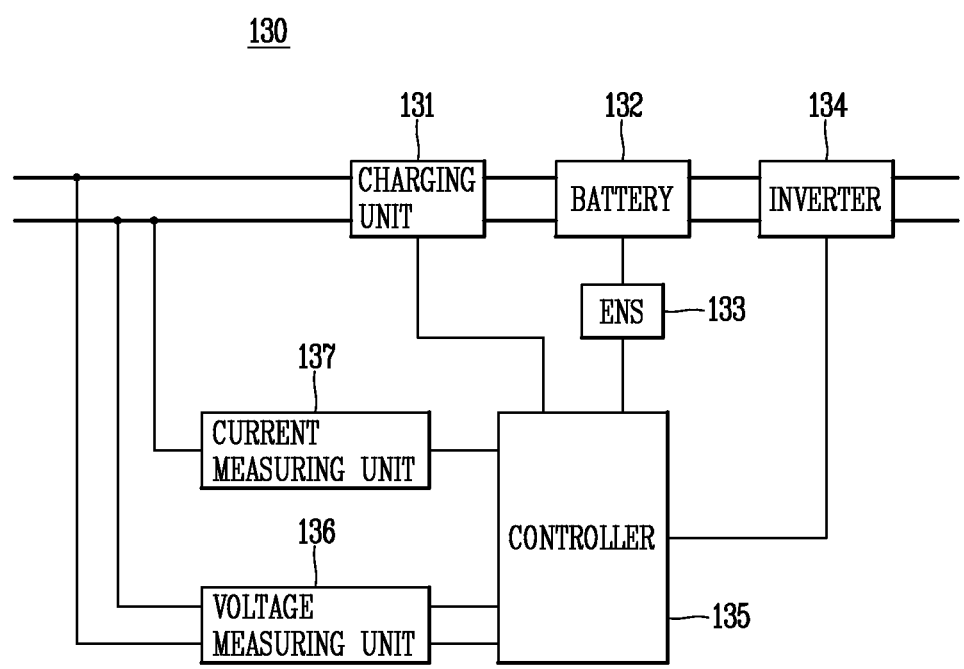
FIG. 4 is a block diagram illustrating a detailed configuration of a system for charging a battery of an energy storage system (ESS) using a PCS according to an embodiment of the present invention.

FIG. 4 is a block diagram illustrating a detailed configuration of a system for charging a battery of an energy storage system (ESS) using a PCS according to an embodiment of the present invention;

Referring to FIG. 4, the ESS 130 may include a charging unit 131, a battery 132, a BMS 133, an inverter 134, a controller 135, a voltage measuring unit 136, and a current measuring unit 137.

The charging unit 131 charges the battery 132 with power provided from the photovoltaic inverter 120, by a control signal generated from the controller 135.

The BMS 133 manages a state of the battery 132, reports the state of the battery 132 to the controller 135, and sets and controls values for charging and discharging the battery 132.

The inverter 134 supplies power of the battery 132 to the load unit 140.

The controller 135 controls the charging unit 131 based on change of an output power of the photovoltaic inverter 120 according to the amount of solar radiation, thereby charging or discharging the battery 132.

The voltage measuring unit 136 measures an input voltage with respect to an input power provided to the ESS 130, and inputs the measured input voltage to the controller 135.

The current measuring unit 137 measures an input current, with respect to power input to the ESS 130, and inputs the measured input current to the controller 135.

The controller 135 may calculate an input power based on an input current and an input voltage measured by the current measuring unit 137 and the voltage measuring unit 135, respectively. Then, the controller 135 may compare the calculated input power with a preset power value, thereby outputting a charging control signal according to a CC mode or a CV mode.

Accordingly, the charging unit 131 may charge the battery 132 by supplying power input from the photovoltaic inverter 120, to the battery 132 in a CC mode or a CV mode, by a charging control signal generated from the controller 135.

The controller 135 may check change of an output power of the photovoltaic inverter 120 according to the amount of solar radiation (output power=voltage×current), based on an input voltage and an input current input from the voltage measuring unit 136 and the current measuring unit 137.

An output power of the photovoltaic inverter 120 according to the amount of solar radiation is increased or decreased, and may exhibit several types of power change.

The controller 135 may set a preset power value by considering an output power of the photovoltaic inverter 120 with respect to power required to charge to the battery 132.

The controller 135 may set a charging mode with respect to the battery 132, by comparing an input power provided from the photovoltaic inverter 120 with a preset power value.

The battery 132 may be charged in a CC mode or a CV mode. The controller 135 charges the battery 132 in a CC mode or a CV mode, according to a set charging mode.

In the constant current (CC) mode, the charging unit 131 charges the battery 132 by supplying a constant current to the battery 132. In the constant voltage (CV) mode, the charging unit 131 charges the battery 132 by supplying a constant voltage to the battery 132.

The CC mode is performed at a section where an input power provided from the photovoltaic inverter 120 is higher than a preset power value, and is used for high-speed charging. On the other hand, the CV mode is performed at a section where an input power provided from the photovoltaic inverter 120 is lower than the preset power value, and is used for low-speed charging.

The controller 135 may be configured to charge the battery 132 in a CV mode when the input power is increased as time lapses, and to charge the battery 132 in a CC mode when the input power is equal to or more than the preset power value.

The controller 135 may be configured to charge the battery 132 in a CC mode when the input power is decreased as time lapses, and to charge the battery 132 in a CV mode when the input power is less than the preset power value.

The controller 135 may be configured to charge the battery 132 in a CV mode when the input power is increased and decreased as time lapses, to charge the battery 132 in a CC mode when the input power is equal to or more than the preset power value, and to charge the battery 132 in a CV mode when the input power is less than the preset power value.

Figure 5:
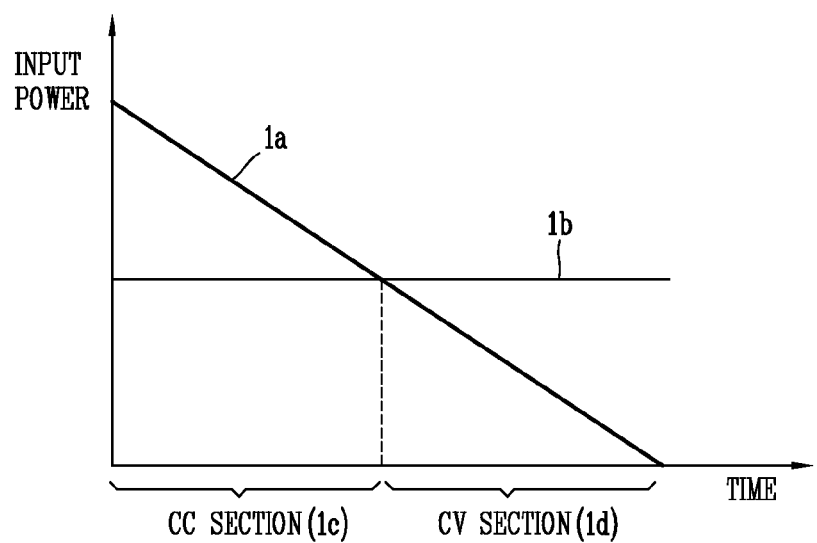
FIG. 5 is a graph illustrating power decrease type of power change in a system for charging a battery of an energy storage system (ESS) using a PCS according to an embodiment of the present invention.

FIG. 5 is a graph illustrating power decrease type of power change in a system for charging a battery of an energy storage system (ESS) using a PCS according to an embodiment of the present invention.

Referring to FIG. 5, an input power provided to the ESS 130 from the photovoltaic inverter 120 is decreased as time lapses. This case may correspond to a time when the amount of photovoltaic energy is decreased at sunset.

In case of power decrease type of power change, the controller 135 of the ESS 130 charges the battery 132 in a CC mode, at a CC section (1*c*) where an input power (1*a*) is equal to or more than a preset power value (1*b*). On the other hand, the controller 135 of the ESS 130 charges the battery 132 in a CV mode, at a CV section (1*d*) where the input power (1*a*) is lower than the preset power value (1*b*).

In the CC mode executed in the CC section (1*c*), the battery 132 can be rapidly charged, since it is charged with a predetermined current value. On the other hand, in the CV mode executed in the CV section (1*d*), an over-load does not occur on the photovoltaic inverter even if the photovoltaic inverter generates a low output power, since the battery 132 is charged with a minimum current.

Figure 6:
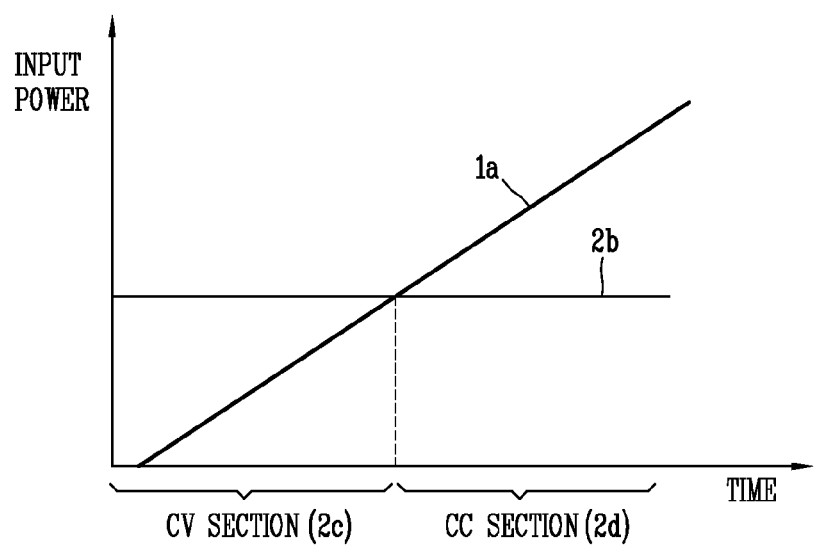
FIG. 6 is a graph illustrating power increase type of power change in a system for charging a battery of an energy storage system (ESS) using a PCS according to an embodiment of the present invention.

FIG. 6 is a graph illustrating power increase type of power change in a system for charging a battery of an energy storage system (ESS) using a PCS according to an embodiment of the present invention.

Referring to FIG. 6, an input power provided to the ESS 130 from the photovoltaic inverter 120 is increased as time lapses. This case may correspond to a time when the amount of photovoltaic energy is increased at sunrise.

In case of power increase type of power change, the controller 135 of the ESS 130 charges the battery 132 in a CV mode, at a CV section (2*c*) where an input power (2*a*) is equal to or less than a preset power value (2*b*). On the other hand, the controller 135 of the ESS 130 charges the battery 132 in a CC mode, at a CC section (2*d*) where the input power (2*a*) is higher than the preset power value (2*b*).

In the CC mode executed in the CC section (2*d*), the battery 132 can be rapidly charged, since it is charged with a predetermined current value. On the other hand, in the CV mode executed in the CV section (2*c*), an over-load does not occur on the photovoltaic inverter even if the photovoltaic inverter generates a low output power, since the battery 132 is charged with a minimum current.

Figure 7:
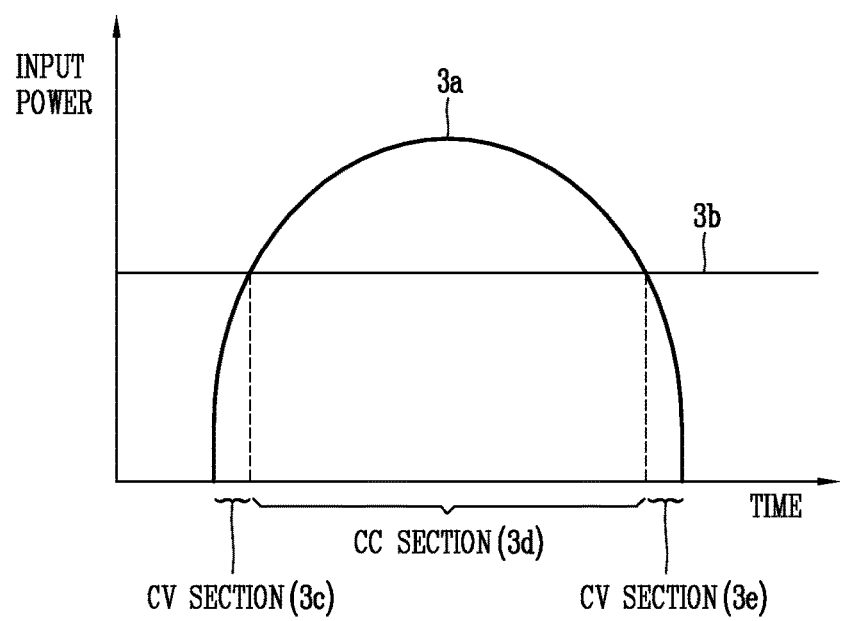
FIG. 7 is a graph illustrating power increase and decrease type of power change in a system for charging a battery of an energy storage system (ESS) using a PCS according to an embodiment of the present invention.

FIG. 7 is a graph illustrating power increase and decrease type of power change in a system for charging a battery of an energy storage system (ESS) using a PCS according to an embodiment of the present invention.

Referring to FIG. 7, an input power provided to the ESS 130 from the photovoltaic inverter 120 is increased and then is decreased as time lapses. This case may correspond to a case where the amount of photovoltaic energy is gradually increased at noon and then is gradually decreased in the afternoon.

In case of power increase and decrease type of power change, the controller 135 of the ESS 130 charges the battery 132 in a CV mode, at CV sections (3c and 3e) where an input power (3a) is equal to or less than a preset power value (3b). On the other hand, the controller 135 of the ESS 130 charges the battery 132 in a CC mode, at a CC section (3d) where the input power (3a) is higher than the preset power value (3b).

In the CC mode executed in the CC section (3d), the battery 132 can be rapidly charged, since it is charged with a predetermined current value. On the other hand, in the CV mode executed in the CV sections (3c and 3e), an over-load does not occur on the photovoltaic inverter even if the photovoltaic inverter generates a low output power, since the battery 132 is charged with a minimum current.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A system for charging a battery, the system comprising:
 a photovoltaic inverter configured to convert DC power generated by a photovoltaic module into AC power and to output the AC power; and
 an energy storage system configured to set a preset power value by considering output power of the photovoltaic inverter according to an amount of solar radiation and to charge the battery in either a constant current (CC) mode or a constant voltage (CV) mode based on comparing the preset power value to input power that is generated by the photovoltaic module and input from the photovoltaic inverter,
 wherein the energy storage system includes:
  a current measuring unit configured to measure input current of the energy storage system;
  a voltage measuring unit configured to measure input voltage of the energy storage system;
  a controller configured to calculate input power based on the measured input current and the measured input voltage, to compare the calculated input power to the preset power value, and to output a charging control signal according to the CC mode when the input power is greater than or equal to the preset power value and output a charging control signal according to the CV mode when the input power is less than the preset power value; and
  a charging unit configured to charge the battery by supplying the input power from the photovoltaic inverter to the battery according to the output charging control signal.

2. The system of claim 1, wherein the controller is further configured to:
 charge the battery in the CV mode when the input power is increased as time lapses but remains less than the preset power value; and
 charge the battery in the CC mode when the input power is greater than or equal to the preset power value.

3. The system of claim 1, wherein the controller is further configured to:
 charge the battery in the CC mode when the input power is decreased as time lapses but remains greater than or equal to the preset power value; and
 charge the battery in the CV mode when the input power is less than the preset power value.

4. The system of claim 1, wherein the controller is further configured to:
 charge the battery in the CV mode when the input power is increased and decreased as time lapses but remains less than the preset power value;
 charge the battery in the CC mode when the input power is greater than or equal to the preset power value; and
 charge the battery in the CV mode when the input power is less than the preset power value.

* * * * *